US012600388B2

(12) United States Patent
Bieker et al.

(10) Patent No.: US 12,600,388 B2
(45) Date of Patent: Apr. 14, 2026

(54) WHEEL ARRANGEMENT FOR A RAIL VEHICLE

(71) Applicant: Bombardier Transportation GmbH, Berlin (DE)

(72) Inventors: Guido Bieker, Kirchhundem (DE); Reinhard Pieper, Kirchhundem (DE)

(73) Assignee: Bombardier Transportation GmbH, Berlin (DE)

( * ) Notice: Subject to any disclaimer, the term of this patent is extended or adjusted under 35 U.S.C. 154(b) by 982 days.

(21) Appl. No.: 17/440,772

(22) PCT Filed: Feb. 19, 2020

(86) PCT No.: PCT/EP2020/054320
§ 371 (c)(1),
(2) Date: Sep. 19, 2021

(87) PCT Pub. No.: WO2020/187520
PCT Pub. Date: Sep. 24, 2020

(65) Prior Publication Data
US 2022/0185343 A1 Jun. 16, 2022

(30) Foreign Application Priority Data

Mar. 19, 2019 (EP) ..................................... 19163741

(51) Int. Cl.
*B61F 5/30* (2006.01)
*B60B 17/00* (2006.01)
(Continued)

(52) U.S. Cl.
CPC .......... *B61F 5/305* (2013.01); *B60B 17/0006* (2013.01); *B61F 3/16* (2013.01); *B61C 3/00* (2013.01)

(58) Field of Classification Search
CPC ........ B61F 5/305; B61F 3/16; B60B 17/0006; B60B 17/0027; B61C 3/00
(Continued)

(56) References Cited

U.S. PATENT DOCUMENTS 1,975,881 A * 10/1934 Ungar ................. B60B 17/0051
105/100
2,312,361 A * 3/1943 Sanford ................... B60B 37/10
295/44
(Continued)

FOREIGN PATENT DOCUMENTS

CN 105197021 A * 12/2015 ............... B61C 9/50
CZ 285770 B6 * 11/1999 ............... B61C 9/48
(Continued)

OTHER PUBLICATIONS

DE3218088C2 English Translation Mar. 12, 1993 (Year: 1993).*
(Continued)

*Primary Examiner* — S. Joseph Morano
*Assistant Examiner* — Eva L Comino
(74) *Attorney, Agent, or Firm* — Morgan, Lewis & Bockius LLP

(57) ABSTRACT

A wheel arrangement for a rail vehicle, such as a light rail vehicle, can include a wheel unit and an axle unit. The axle unit can be connected to a running gear structure of the rail vehicle. The axle unit can rotatably support the wheel unit. The axle unit can have a wheel bearing unit that forms a bearing for the wheel unit and defines a wheel axis of rotation of the wheel unit during operation of the rail vehicle. The axle unit can also have a wheel support unit and a primary suspension unit. The primary suspension unit can be located kinematically in series between the wheel support unit and the wheel bearing unit such that the wheel support unit supports the wheel bearing unit via the primary sus-
(Continued)

pension unit in a manner resilient in at least two mutually transverse translational degrees of freedom.

15 Claims, 1 Drawing Sheet

(51) Int. Cl.
  *B61C 3/00*          (2006.01)
  *B61F 3/16*          (2006.01)

(58) Field of Classification Search
  USPC .............................................. 225/37; 295/11
  See application file for complete search history.

(56)                    References Cited

U.S. PATENT DOCUMENTS

| | | | | | |
|---|---|---|---|---|---|
| 3,334,596 | A | * | 8/1967 | Mohan ....................... | B61F 3/16 |
| | | | | | 105/169 |
| 4,075,950 | A | * | 2/1978 | Marta ........................ | B61F 3/04 |
| | | | | | 105/198.7 |
| 6,732,775 | B1 | * | 5/2004 | Kikuchi .................... | B60B 9/12 |
| | | | | | 152/48 |
| 7,306,065 | B2 | * | 12/2007 | Nagaya ................... | F16F 15/18 |
| | | | | | 280/124.157 |
| 2004/0099455 | A1 | | 5/2004 | Nagaya | |

FOREIGN PATENT DOCUMENTS

| | | | | | | |
|---|---|---|---|---|---|---|
| DE | 3218088 | C2 | * | 3/1992 | ................ | B61F 3/02 |
| DE | 4304959 | C1 | * | 3/1994 | ................ | B61C 9/46 |
| DE | 102010027841 | A1 | * | 10/2011 | ................ | F16D 1/06 |
| DE | 102012223226 | A1 | * | 6/2014 | ........... | F16H 57/082 |
| DE | 102014200424 | A1 | * | 7/2015 | ................ | B61C 9/44 |
| EP | 0464929 | A2 | | 1/1992 | | |
| EP | 1065122 | A1 | * | 1/2001 | ................ | B61F 3/16 |
| EP | 1380459 | A1 | * | 1/2004 | ................ | B60G 3/20 |
| EP | 3450280 | A1 | * | 3/2019 | ................ | B61F 5/04 |
| FR | 809953 | A | | 3/1937 | | |
| GB | 2114947 | A | * | 9/1983 | ............. | B61F 5/144 |
| SE | 434486 | B | * | 7/1984 | ............. | B60B 9/10 |

OTHER PUBLICATIONS

DE102010027841A1 English Translation ESPACEDONET Oct. 20, 2011 (Year: 2011).*
Second Office Action and Search Report of Chinese Application No. 202080022433.0 dated Dec. 11, 2024, 15 pages including translation.
Office Action and Search Report for Chinese Application No. 202080022433.0, dated May 27, 2024, 10 pages including translation.

* cited by examiner

WHEEL ARRANGEMENT FOR A RAIL VEHICLE

CROSS-REFERENCE TO RELATED APPLICATIONS

This application is a U.S. National Stage Application under 37 C.F.R. § 371 of International Application No. PCT/EP2020/054320, filed Feb. 19, 2020, the entirety of which is incorporated herein by reference.

BACKGROUND OF THE INVENTION

The present invention relates to a wheel arrangement for a rail vehicle, in particular, a light rail vehicle, comprising a wheel unit and an axle unit, wherein the axle unit is configured to be connected to a running gear structure of the rail vehicle. The axle unit rotatably supports the wheel unit and comprises a wheel bearing unit, wherein the wheel bearing unit forms a bearing for the wheel unit and defines a wheel axis of rotation of the wheel unit during operation of the rail vehicle. The axle unit comprises a wheel support unit and a primary suspension unit, wherein the primary suspension unit is located kinematically in series between the wheel support unit and the wheel bearing unit. The invention further relates to a corresponding rail vehicle unit comprising a rail vehicle structure and at least one such wheel arrangement.

In a rail vehicle, the primary suspension represents the transition from the so-called primary unsprung mass, i.e., the part of the vehicle which is directly subject to the loads introduced via the track without the interposition of a spring element (and, typically, also a damping element), and the remainder of the vehicle. With conventional running gears for rail vehicles the primary suspension is typically arranged between the axle or wheel set shaft of the wheel unit (e.g., a single wheel, a wheel pair or a wheel set) and a vehicle structure, typically a running gear frame of the vehicle or eventually even the wagon body structure itself. Such a configuration is known, for example, from EP 1 065 122 B1 (the entire disclosure of which is incorporated herein by reference).

For passenger comfort and vehicle dynamics reasons, in particular, in so-called light rail vehicles (LRV), it is typically desired to reduce the unsprung mass as far as possible. Hence, typically, rail vehicle manufacturers strive to make the components forming the unsprung mass as light as possible. However, this approach has its clear limitations in terms of structural integrity and safety requirements.

Another approach to reduce the unsprung mass could be to place the primary suspension as far as possible towards the point of wheel to rail contact, in particular, to integrate the primary suspension into the wheel. Such approaches are generally known from FR 809.953 and FR 1.045.431 (the entire disclosure of which is incorporated herein by reference). However, these solutions have the disadvantage that the wheel is guided in the height direction via a sliding guide which is prone to wear and early replacement or increased maintenance effort.

SUMMARY OF THE INVENTION

Thus, it is the object of the present invention to provide a wheel arrangement for a rail vehicle and a rail vehicle unit as described above, which do not show the disadvantages described above, or at least show them to a lesser extent, and, in particular, allow simple and efficient reduction of the overall primary unsprung mass of the vehicle while providing a robust and durable design.

The above objects are achieved starting from a wheel arrangement according to the preamble of claim 1 by the features of the characterizing part of claim 1.

The present invention is based on the technical teaching that, while using simple and robust components, considerable reduction of the primary unsprung mass may be achieved if the primary suspension unit is integrated at the level of the wheel unit rather than between the axle unit and the vehicle structure, while at the same time providing resilient support of the wheel in at least two mutually transverse translational degrees of freedom. More precisely, integrating the primary suspension within the axle unit, e.g., in the kinematic chain between the wheel bearing unit and the support unit supporting the wheel bearing unit (i.e., integrating the primary suspension in the non-rotating part of the axle unit itself), allows greatly reducing the primary unsprung mass while still allowing the use of comparatively simple and robust components. Moreover, configuring the axle unit such that resilient support of the wheel bearing unit is provided in two mutually transverse translational degrees of freedom (preferably in the plane of rotation defined by the wheel bearing unit) allows implementing simple and robust primary suspension elements providing durable, low wear support (with little, if any, frictional contact and motion between sprung and unsprung components). Resilient support in at least two mutually transverse translational degrees of freedom has further beneficial effects on the running behavior of the wheel arrangement. This is not least due to the fact that relative motions between the track and the vehicle structure in these at least two mutually transverse translational degrees of freedom can be absorbed at a very "early" stage (close to the point of wheel to rail contact).

The resilient support (i.e., the support achieving primary spring type support effects) in two mutually transverse translational degrees of freedom, in particular, may be configured such that resilient or primary spring type support, respectively, is not only achieved in the height direction but also in the longitudinal direction (essentially the direction of travel) of the vehicle. Such a lower stiffness (compared to conventional wheel units) in the longitudinal direction has great dynamic advantages, e.g., when running through a track switch (i.e., a gap in the rail). At these occasions, the wheel is not only subject to a vertical impact component (i.e., an impact component in the height direction), it is also subject to a considerable longitudinal impact component in the longitudinal direction. The additional resilient support in the longitudinal direction, hence, has the great advantage of at least partially absorbing the longitudinal impact component. This is especially beneficial if the wheel arrangement is directly (i.e., without the interposition of any secondary suspension) coupled to a structural part of the wagon body structure itself.

Hence, according to one aspect, the present invention relates to a wheel arrangement for a rail vehicle, in particular, a light rail vehicle, comprising a wheel unit and an axle unit. The axle unit is configured to be connected to a running gear structure of the rail vehicle. The axle unit rotatably supports the wheel unit. The axle unit comprises a wheel bearing unit, wherein the wheel bearing unit forms a bearing for the wheel unit and defines a wheel axis of rotation of the wheel unit during operation of the rail vehicle. The axle unit comprises a wheel support unit and a primary suspension unit, wherein the primary suspension unit is located kinematically in series between the wheel support unit and the wheel bearing unit. The wheel support unit supports the wheel bearing unit via the primary suspension unit in a manner resilient in at least two mutually transverse translational degrees of freedom. By this means, the above reduction in primary unsprung mass while using comparatively simple and robust and durable components may be achieved. While of course still possible, less focus has to be put on the weight reduction of these components. This, in particular, allows use of less costly materials, such as lower grade steel or the like, (on the sprung or vehicle side, respectively, of the primary suspension) which are eventually less susceptible to damage, crack propagation etc.

It should be noted that the running gear structure in the sense of the present disclosure can be any structure of the vehicle suitable for transferring the load between the wheel and the wagon body. Examples for such running gear structures are conventional running gear frames (e.g., bogie frames or the like) or other frame elements located (in the force flow) between the wheel and the wagon body, and typically connected to the wagon body via a secondary suspension system. Other examples for such a running gear structure could however also be specifically reinforced parts or components of the wagon body itself, which serve as the interface for the axle unit.

It will be appreciated that, in principle, the primary suspension unit may be integrated within the axle unit at any desired and suitable location in the kinematic chain between the wheel support unit and the wheel bearing unit. Moreover, the type and working principle, respectively, of the primary suspension unit may be adapted to the location of the primary suspension unit. In any case, of course, the design and location of the primary suspension unit is adapted and, preferably, optimized, to the loads to be expected during operation of the vehicle.

With certain variants, a gap is formed between the wheel support unit and the wheel bearing unit, and the primary suspension unit is connected to the wheel support unit and the wheel bearing unit, wherein the primary suspension unit bridges at least a part of the gap between the wheel support unit and the wheel bearing unit. By this means a very simple integration of the primary suspension unit may be achieved. In particular, the location and orientation of the gap and the bridging primary suspension unit may be comparatively easily adapted to the loads to be expected during operation.

Here, two primary types of relative motion between the parts of the wheel support unit and the wheel bearing unit forming the bridged part of the gap may be taken into account. One is essentially a shear motion which then typically leads to the use of one or more shear spring elements for the primary suspension unit, whereas the other one is essentially a normal or breathing motion (increasing or decreasing the width of the gap) which typically leads to the use of one or more compression spring elements for the primary suspension unit. Of course, eventually, any combination of these motions and spring elements, respectively, may also be used, in particular, depending on the loads to be expected during operation of the vehicle.

The primary suspension unit, in principle, may be designed in any desired and suitable way to achieve resilient primary suspension in the required degrees of freedom. In particular, primary suspension elements of any desired configuration and shape may be used. For example, conventional metal spring elements may be used alone or in combination with other components, such as, for example, damping elements etc. Similarly, polymer springs, rubber springs or laminated metal rubber springs may be used alone or in arbitrary combination with other spring and/or damping elements.

With certain variants, the primary suspension unit is a shear spring unit. Such shear spring units typically have the advantage that they provide suitable spring motion in their shear direction, typically in a shear plane, while being comparatively rigid in other directions (e.g., in a direction perpendicular to a shear plane of the shear spring unit). Preferably, the shear spring unit comprises at least one shear spring element providing resilient support of the wheel unit on the axle unit. Such shear spring elements are well-known in the art and readily available in multiple configurations. Typically, such shear spring elements are formed by so-called laminated metal rubber elements which comprise one or more consecutive layers of metal and rubber.

With certain variants implementing a shear spring principle, the primary suspension unit comprises at least one primary suspension element providing resilient support of the wheel unit on the axle unit. The at least one primary suspension element is arranged and configured such that, under static load of the rail vehicle on a straight level track, the primary suspension element is at least primarily, in particular, at least substantially exclusively, under a shear stress.

The primary suspension unit may comprise one or more primary suspension elements which may generally be of arbitrary shape and design, respectively, adapted to the requirements, in particular the loads to be taken, during operation of the rail vehicle. For example, one or more block shaped primary suspension elements may be used, i.e., interposed between the wheel bearing unit and the wheel support unit. With certain variants, the primary suspension unit comprises at least one ring shaped primary suspension element providing resilient support of the wheel unit on the axle unit. Particularly beneficial in simple variants may be achieved if the at least one primary suspension element extends along an outer circumference of the wheel support unit. In other words, with certain variants, the ring shaped primary suspension element may partially or even fully surround the wheel support unit. This has the advantage that a particularly beneficial introduction of the loads from the wheel bearing unit in the wheel support unit may be achieved.

With certain variants having a simple distributed configuration of the location of the primary suspension elements, the primary suspension unit comprises a plurality of primary suspension elements providing resilient support of the wheel unit on the axle unit. It will be appreciated that such a distributed configuration of the primary suspension elements may be provided, for example, by having multiple primary suspension elements located on the same side of the wheel unit (e.g., an inner side or an outer side of the wheel unit, inner and outer being defined with respect to the track the wheel unit is to be operated on). In addition or as an alternative one or more primary suspension elements may be provided on either side of the wheel unit. Here as well, with certain preferred variants, the plurality of primary suspension elements may be distributed along an outer circumference of the wheel support unit, thereby achieving favorable introduction of loads into the wheel support unit.

With certain particularly compact and favorable variants, the wheel bearing unit has a recess, and the wheel support unit at least partially extends into the recess. This reaching into the recess of the wheel bearing unit has several advantages, one being the fact that this allows a particularly compact design. Another advantage being the possibility to have the wheel support unit reach through this recess and provide support on both lateral sides of the wheel bearing unit. Such a configuration is also particularly beneficial in terms of failure safety and failure running properties, since even upon failure of the primary suspension unit dislocation of the wheel unit from the axle unit may prevented by simple safety means. Hence, with preferred variants, the wheel support unit extends through the recess.

The above recess of the wheel bearing unit may generally be of any arbitrary design and shape as long as it allows the wheel support units to reach into the recess. With particularly simple variants allowing compact designs, the recess has a recess axis, the recess axis, in an unloaded state of the wheel arrangement, extending at least substantially parallel to the wheel axis of rotation.

With certain variants, the primary suspension unit comprises at least one primary suspension element providing resilient support of the wheel unit on the axle unit, the primary suspension element is connected to the wheel support unit and the wheel bearing unit, and at least a part of the primary suspension element extends within the recess. By this means, a very compact configuration may be achieved. In particular, the at least one primary suspension element may be configured and arranged in a similar manner as conventional primary suspension elements are configured and arranged between the wheel arrangement and the running gear frame structure.

With further variants, the wheel support unit defines a wheel support unit axial direction, a wheel support unit circumferential direction and a wheel support unit radial direction, the wheel support unit axial direction, in an unloaded state of the wheel arrangement, extending at least substantially parallel to the wheel axis of rotation. Here, at least one radial protrusion, in particular, a radial web element, protrudes from the wheel support unit in the wheel support unit radial direction, and the primary suspension unit is connected to a face of the at least one radial protrusion facing towards the wheel bearing unit. By this means, a simple connection may be formed between the wheel bearing unit and the radial protrusion leading to a particularly compact and beneficial design.

It will be appreciated that one or more of these radial protrusions may be provided at the same side of the wheel unit. Each protrusion may extend over a certain part of the circumference of the wheel support unit, the angle of extension along the circumferential direction of the wheel support unit depending, in particular, on the number of protrusions provided on the same side of the wheel unit. Preferably, the at least one radial protrusion, in particular, extends along the wheel support unit circumferential direction over at least 45%, preferably at least 60%, more preferably at least 80%, in particular, 100%, of a circumference of the wheel support unit.

It will be appreciated that, generally, one single protrusion located on one side of the wheel unit may be sufficient. With certain variants providing beneficial support, in particular, of the alternating lateral loads acting along the axis of rotation of the wheel unit, at least one such radial protrusion is provided on both the inner and the outer side of the wheel unit. Hence, with certain variants, an inner radial protrusion is located on an inner side of the wheel bearing unit, the inner side, during use of the rail vehicle on a track, facing towards a center of the track, and an outer radial protrusion is located on an outer side of the wheel bearing unit, the outer side, during use of the rail vehicle, facing away from the center of the track. In order to provide resilient support of the wheel unit on the axle unit, at least one inner primary suspension element of the primary suspension unit is connected to the inner radial protrusion and to the wheel bearing unit, in particular, to an associated inner radial segment of the wheel bearing unit. Furthermore, at least one outer primary suspension element of the primary suspension unit is connected to the outer radial protrusion and to the wheel bearing unit, in particular, to an associated outer radial segment of the wheel bearing unit.

Similarly, with further variants, the wheel support unit defines a wheel support unit axial direction, a wheel support unit circumferential direction and a wheel support unit radial direction, the wheel support unit axial direction, in an unloaded state of the wheel arrangement, extending at least substantially parallel to the wheel axis of rotation. Here, the wheel support unit defines a radial cavity, the radial cavity extending in the wheel support unit circumferential direction and in the wheel support unit radial direction, and at least a part of the wheel bearing unit is inserted, in the wheel support unit radial direction, into the radial cavity. Also by this means, particularly compact configurations may be achieved. These configurations, in particular, are particularly beneficial in terms of their failure modes in case of potential failure of the primary suspension unit. This is not least due to the fact that the insertion of the wheel bearing unit in the radial cavity ensures that the wheel bearing unit and, consequently, the wheel unit is generally kept in place even in case of a failure of the primary suspension unit.

As previously noted, the primary suspension unit may comprise one or more primary suspension elements of arbitrary and suitable design and configuration. Particularly compact designs may be achieved if the primary suspension unit comprises at least one primary suspension element providing resilient support of the wheel unit on the axle unit, wherein the primary suspension element comprises at least one of a polymer element, a rubber element, and a laminated rubber metal spring element.

It will be appreciated that, in general, that the rigidity of the primary suspension unit may be substantially uniform in all degrees of freedom in space. However, with certain embodiments, the primary suspension unit may have different behavior in different degrees of freedom in order to account for the load cases to be expected during operation of the particular vehicle the wheel arrangement is to be operated on. Hence, with certain preferred variants, the primary suspension unit has a first rigidity in a first direction, a second rigidity in a second direction and a third rigidity in a third direction, the first, second and third direction being mutually orthogonal. During operation of the rail vehicle, the first direction is substantially parallel to a direction of travel of the rail vehicle and the second direction is substantially parallel to a wheel contact plane defined by a track used by the rail vehicle. With certain variants, the third rigidity is lower than at least one of the first rigidity and the second rigidity (typically lower than both the first and second rigidity). By this means, a primary suspension may be achieved which is suitably compliant in the height direction of the vehicle, while being comparatively rigid in the longitudinal and transverse direction of the vehicle. In addition or as an alternative, the first rigidity may be lower than the second rigidity.

It will be appreciated that the wheel support unit may, in general, have any desired and suitable shape. Preferably, it is an elongated element (e.g., an axle stub element), which is preferably substantially symmetric (preferably rotationally symmetric) with respect to an axis which (in an unloaded state) is substantially parallel to the axis of rotation of the wheel unit. Moreover, the wheel support unit may be a solid or partially hollow component.

It will be appreciated that the wheel arrangement may be configured for use in a motorized or non-motorized implementation. With certain variants designed for a motorized implementation, the wheel support unit is essentially tube shaped, wherein a drive shaft unit, at a first end, is connected to the wheel unit, the drive shaft unit extends through an interior section of the essentially tube shaped wheel support unit. The drive shaft unit, at a second end opposite to the first end, is configured to be connected to a drive unit of the rail vehicle, in particular, has a toothed section configured to connect to the drive unit. By this means a particularly beneficial and compact design may be achieved.

The present invention further relates to a rail vehicle unit comprising a rail vehicle structure, and at least one wheel arrangement according to the invention connected to the rail vehicle structure. It will be appreciated that the rail vehicle structure may comprise an entire rail vehicle or a wagon body of the rail vehicle, respectively. With further variants, the rail vehicle structure may comprise a running gear unit, in particular, a running gear frame, connected to the at least one wheel arrangement. With such a rail vehicle unit the above variants and advantages can be achieved to the same extent, such that reference is made to the explanations given above.

The invention is explained in greater detail below with reference to embodiments as shown in the appended Figures.

DETAILED DESCRIPTION OF THE INVENTION

Figure 1:
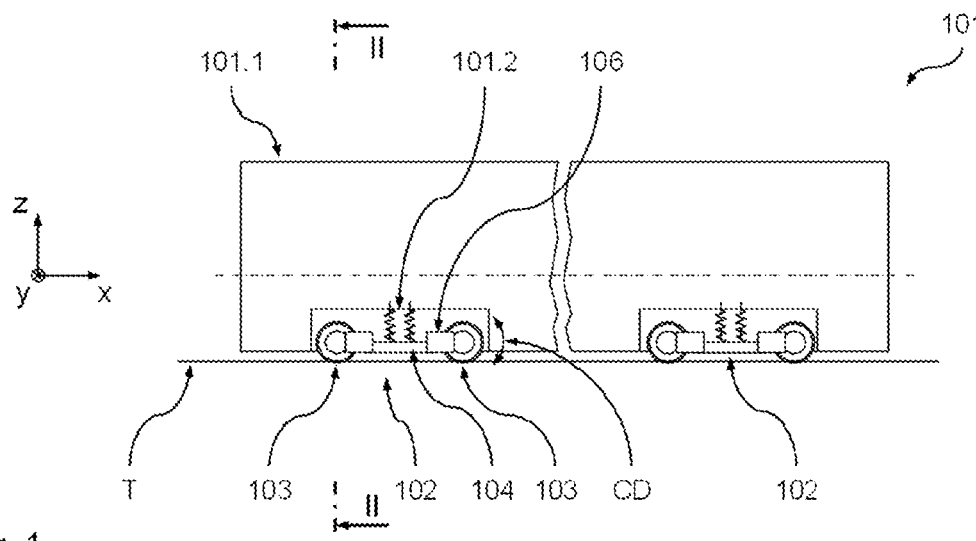
FIG. 1 is a schematic side view of a part of a preferred embodiment of a rail vehicle according to the present invention with a preferred embodiment of a wheel arrangement according to the present invention.
Figure 2:
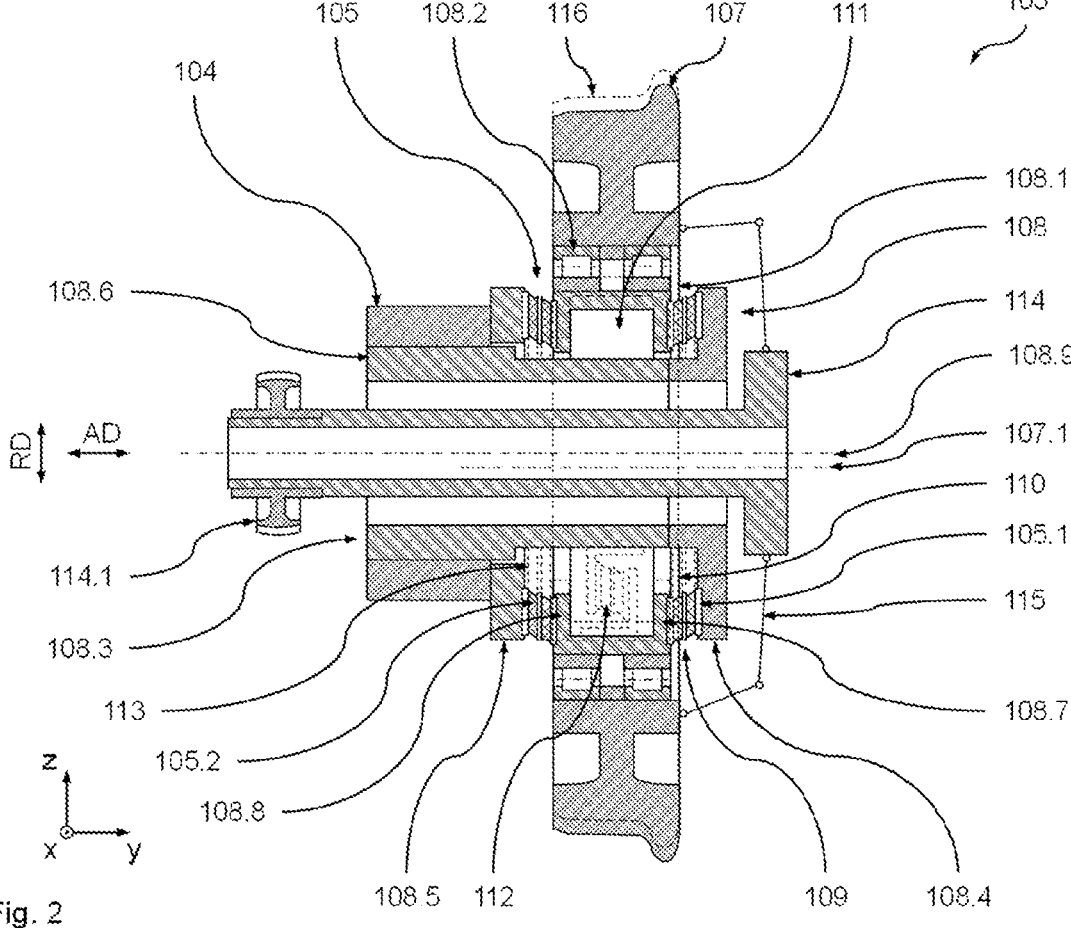
FIG. 2 is a schematic partially sectional view of the wheel arrangement of FIG. 1 along line II-II of FIG. 1.

With reference to FIGS. 1 and 2 preferred embodiments of a rail vehicle 101 according to the present invention comprising a preferred embodiment preferred of a running gear 102 according to the invention further comprising a preferred embodiment of a wheel arrangement 103 according to present the invention will now be described in greater detail.

In order to simplify the explanations given below, an xyz-coordinate system has been introduced into the Figures, wherein (on a straight, level track T) the x-axis designates the longitudinal axis (or direction, respectively) of the rail vehicle 101, the y-axis designates the transverse axis (or direction, respectively) of the rail vehicle 101 and the z-axis designates the height axis (or direction, respectively) of the rail vehicle 101 (the same, of course, applies for the running gear 102). It will be appreciated that all statements made in the following with respect to the position and orientation of components of the rail vehicle, unless otherwise stated, refer to a static situation with the rail vehicle 101 standing on a straight level track under nominal loading.

The vehicle 101 is a low floor light rail vehicle (LRV) such as a tramway or the like. The vehicle 101 comprises a wagon body 101.1 supported by a suspension system on the running gear 102. The running gear 102 comprises four wheel arrangements 103 according to the invention supporting a running gear frame 104. Each wheel arrangement 103 integrates a primary suspension unit 105, while the running gear frame 104 supports the wagon body via a secondary suspension unit 101.2.

It will be appreciated, however, that with other embodiments, any other configuration of the running gear 102 may be chosen. For example, each wheel arrangement 103 or each pair of wheel arrangements 103 may have its own specifically assigned frame unit forming the interface for the respective wheel arrangement 103.

In the present example, each of the wheel arrangements 103 is a motorized wheel arrangement 103 driven by a drive unit 106 which typically includes a motor and an associated gearbox. Of course, with certain variants, one motor may drive more than one wheel arrangement 103 via a corresponding gears etc. Similarly, with other variants, some or all of the wheel arrangements 103 may be non-motorized.

As can be seen from FIG. 2, the wheel arrangement 103 comprises a wheel unit 107 and an axle unit 108. In the mounted state as shown, the axle unit 108 is connected to a running gear structure, namely the running gear frame 104, of the rail vehicle 101. The axle unit 108 rotatably supports the wheel unit 107. To this end, the axle unit 108 comprises a wheel bearing unit 108.1, wherein the wheel bearing unit comprises a bearing 108.2 to form a bearing for the wheel unit 107 and define a wheel axis of rotation 107.1 of the wheel unit 107 during operation of the rail vehicle 101. In the present example, the bearing 108.2 is a conventional roller bearing. It will be appreciated, however, that with other variants, any other type of bearing providing suitable role in support to the wheel unit 107 may be used.

The axle unit 108 further comprises a wheel support unit 108.3 and a primary suspension unit 105. The primary suspension unit 105 is located kinematically in series between the wheel support unit 108.3 and the wheel bearing unit 108.1, such that the wheel support unit 108.3 supports the wheel bearing unit 108.1 via the primary suspension unit 105.

Furthermore, as will be described below, the axle unit 108 is configured such that resilient support of the wheel bearing unit 108.1 is provided in two mutually transverse translational degrees of freedom in the plane of rotation defined by the wheel bearing unit 108.1. This allows implementing simple and robust primary suspension elements of the primary suspension unit 105 as will be explained further below. This configuration provides durable, low wear support (with little, if any, frictional contact and motion between sprung and unsprung components). Resilient support in at least two mutually transverse translational degrees of freedom has further beneficial effects on the running behavior of the wheel arrangement 103. This is not least due to the fact that relative motions between the track T and the vehicle structure in these at least two mutually transverse translational degrees of freedom can be absorbed at a very "early" stage (close to the point of wheel to rail contact).

The resilient support by the primary suspension unit 105 (i.e., the support achieving primary spring type support effects) in two mutually transverse translational degrees of freedom, in the present example is configured such that it is not only achieved in the height direction (z axis) but also in the longitudinal direction (x axis) of the vehicle 101. Such a lower stiffness (compared to conventional wheel units) in the longitudinal direction has great dynamic advantages, e.g., when running through a track switch (which inevitably represents a short gap in the rail). At these occasions, the wheel unit 107 is not only subject to a vertical impact component (i.e., an impact component in the height direction), it is also subject to a considerable longitudinal impact component in the longitudinal direction. The additional resilient support in the longitudinal direction achieved by the primary suspension unit 105 has the great advantage of at least partially absorbing the longitudinal impact component.

Moreover, other than with most conventional suspension systems for rail vehicles, where the primary suspension is typically located kinematically in series between the axle unit and the running gear frame (i.e., if theoretically mapped to FIG. 2, would conventionally be located between the support unit 108.3 and the running gear frame 104), the present solution integrates the primary suspension within the axle unit 108.

By this integration of the primary suspension unit 105 into the axle unit 108, only the wheel unit 107 and wheel bearing unit 108.1 still pertain to the primary unsprung mass of the rail vehicle 101. Hence, the present solution greatly reduces the primary unsprung mass, while still using comparatively simple and robust components. Thus, while of course still possible, less focus has to be put on the weight reduction of the components of the wheel arrangement 103. This, in particular, allows use of less costly materials for the components of the wheel unit 107 and the axle unit 108, such as lower grade steel or the like, which are eventually less susceptible to damage, crack propagation etc.

It will be appreciated that, in principle, the primary suspension unit 105 may be integrated within the axle unit 108 at any desired and suitable location in the kinematic chain between the wheel support unit 108.3 and the wheel bearing unit 108.1. Moreover, the type and working principle, respectively, of the primary suspension unit 105 may be adapted to the location of the primary suspension unit 105. In any case, of course, the design and location of the primary suspension unit 105 is adapted and, preferably, optimized, to the loads to be expected during operation of the vehicle 101.

In the present example, a gap 109 is formed between the wheel support unit 108.3 and the wheel bearing unit 108.1. The primary suspension unit 105 is connected to the wheel support unit 108.3 and the wheel bearing unit 108.1 in such a manner that the primary suspension unit 105 bridges a part of the gap 109. By this means a very simple integration of the primary suspension of unit 105 into the axle unit 108 is achieved. In practice, the location and orientation of the gap 109 and the bridging primary suspension unit 105 may be comparatively easily adapted to the loads to be expected during operation of the vehicle 101.

The wheel bearing unit 108.1 has a central recess 110, wherein the wheel support unit 108.3 extends into and through the recess 110, such that a particularly compact design is achieved. By means of the wheel support unit 108.3 reaching through this recess 110 support can be provided to the wheel bearing unit 108.1 on both lateral sides of the wheel bearing unit 108.1. Such a configuration is also particularly beneficial in terms of failure safety and failure running properties, since even upon failure of the primary suspension unit 105 dislocation of the wheel unit 107 from the axle unit 108 may be prevented by simple safety means as will be explained further below.

It will be appreciated that the recess 110 of the wheel bearing unit 108.1 may generally be of any arbitrary design and shape as long as it allows the wheel support unit 108.3 to reach into the recess 110 under any conditions to be expected during normal operation the vehicle 101. With particularly simple variants allowing compact designs, the recess 110 has a recess axis, wherein the recess axis, in an unloaded state of the wheel arrangement 103, extends at least substantially parallel to the wheel axis of rotation 107.1. Typically, as in the present example, the recess axis substantially coincides with the wheel axis of rotation 107.1.

In the present example, the wheel support unit 108.3 defines a wheel support unit axial direction AD, a wheel support unit circumferential direction CD and a wheel support unit radial direction RD, wherein the wheel support unit axial direction AD, in an unloaded state of the wheel arrangement (as shown in the solid lines in FIG. 2), extends at least substantially parallel to the wheel axis of rotation 107.1.

The wheel support unit 108.3 comprises two radial protrusions in the form of an inner radial web element 108.4 and an outer radial web element 108.5 as well as a central support stub 108.6. The central support stub 108.6 is rigidly connected to the running gear frame 104.

Both, radial web elements 108.4, 108.5 protrude from the wheel support unit 108.3 in the wheel support unit radial direction. It will be appreciated that, in the present embodiment, the inner radial protrusion 108.4 is located on an inner side of the wheel bearing unit 108.1, wherein this inner side, during use of the rail vehicle 101 on a track T, (in the vehicle transverse direction, y-axis) faces towards a center of the track T. Consequently, the outer radial protrusion 108.5 is located on an outer side of the wheel bearing unit 108.1, wherein the outer side, during use of the rail vehicle 101, faces away from the center of the track T.

It will be appreciated that, in the present example, the outer radial web element 108.5 is formed by a separate part not directly connected to the central support stub 108.6 of the support unit 108.3 but rather connected to the running gear frame 104. It will be appreciated that, with other variants, the outer radial web element 108.5 may also be in direct contact with the central support stub 108.6 or be an integral part of the central support stub 108.6. Similar applies to the inner radial web element 108.4, which in the present example is disengageably connected to the central support stub 108.6, but may also be an integral part of the central support stub 108.6 in other cases. Similarly, depending on the design of the running gear frame 104, the inner radial web element might also be connected to the running gear frame 104. Furthermore, with certain variants, the respective interface for the primary suspension unit 105 provided by the respective radial web element 108.4, 108.5 might also be directly provided by a surface of the running gear frame 104.

In order to provide resilient support of the wheel unit 107 on the axle unit 108 via the primary suspension unit 105, an inner primary suspension element 105.1 of the primary suspension unit 105 is connected to a face of the inner radial web element 108.4 (facing the wheel bearing unit 108.1) and to the wheel bearing unit 108.1, thereby bridging the gap 109. As can be seen from FIG. 2, the inner primary suspension element 105.1 is connected to an associated inner radial segment 108.7 of the wheel bearing unit 108.1. Furthermore, an outer primary suspension element 105.2 of the primary suspension unit 105 is connected to a face of the outer radial web element 108.5 (facing the wheel bearing unit 108.1) and to the wheel bearing unit 108.1, more precisely to an associated outer radial segment 108.8 of the wheel bearing unit 108.1.

It will be appreciated that the design of the wheel bearing unit 108.1 with the radial segments 108.7 and 108.8 yields a comparatively lightweight design. Nevertheless, with other variants, any other shape of the wheel bearing unit 108.1 may be selected as long as there is an appropriate interface for the respective primary suspension element 105.1 and 105.2, respectively.

It will be further appreciated that, generally, with other variants, one single protrusion or radial web element 108.4, 108.5, respectively, located on one side of the wheel unit 107 may be sufficient. However, as with the present example, beneficial support of the alternating lateral loads acting along the axis of rotation 107.1 of the wheel unit 107 is achieved via the radial protrusions or web element 108.4 and 108.5, located on both the inner and the outer side of the wheel unit 107.

It will be appreciated that one or more of these radial protrusions or web elements 108.4 and 108.5 may be provided at the same side of the wheel unit 107. Each protrusion 108.4, 108.5 may extend over a certain part of the circumference of the wheel support unit 108.3, the angle of extension along the circumferential direction of the wheel support unit 108.3 depending, in particular, on the number of protrusions 108.4, 108.5 provided on the same side of the wheel unit 107. In particular in the case of a plurality of primary suspension elements 105.1, 105.2, respectively, on either side, one protrusion or web element 108.4, 108.5, respectively, may be provided per primary suspension element 105.1, 105.2. Preferably, the respective radial protrusion 108.4, 108.5 extends along the wheel support unit circumferential direction over at least 45%, preferably at least 60%, more preferably at least 80%, of the circumference of the wheel support unit 108.3. In the present example, however, the respective protrusion or web element 108.4 and 108.5 is a substantially ring-shaped component extending over 100% of the circumference of the wheel support unit 108.3, thereby yielding a very robust and simple design. Furthermore, in a very beneficial and simple way, ingress of liquids and/or solids, such as water, salt, sand and other debris into the gap 109 can be avoided with such a configuration.

With the design as described above, in the present example, the wheel support unit 108.3 defines a radial cavity, the radial cavity 111 extending in the wheel support unit circumferential direction CD and in the a wheel support unit radial direction RD. In the present example, at least a part of the wheel bearing unit 108.1 is inserted, in the wheel support unit radial direction RD, into the radial cavity 111. By this means, a particularly compact configuration is achieved. Moreover, this configuration is particularly beneficial in terms of its failure modes in case of potential failure of the primary suspension unit 105. This is not least due to the fact that the insertion of the wheel bearing unit 108.1 in the radial cavity 111 ensures that the wheel bearing unit 108.1 and, consequently, the wheel unit 107 is generally kept in place on the wheel support unit 108.3 even in case of a failure of the primary suspension unit 105.

As had been explained above, generally, two primary types of relative motion between the parts of the wheel support unit 108.3 and the wheel bearing unit 108.1 which form the bridged part of the gap 109 may be taken into account or considered when integrating the primary suspension unit 105. One is essentially a shear motion which then typically leads to the use of one or more shear spring elements for the primary suspension unit 105. Such a design is shown in the present example and will be described in further detail below.

Another type of motion which might be considered or used for the primary suspension motion is essentially a normal or breathing motion (increasing or decreasing the width of the gap 109). Such a breathing motion could leads to the use of one or more compression spring elements for the primary suspension unit 105. However, as is indicated in FIG. 2 by the dashed contour 112, here as well one or more shear spring elements 112 could be used within the part of the gap 109 executing the breathing motion during operation. As shown, the breathing motion part of the gap 109 could be located within the recess 110 such that a particularly compact configuration may be achieved. In particular, a more or less conventional primary spring arrangement could be used at the location of the elements 112.

Of course, eventually, any combination of these motions and spring elements 105.1, 105.2 and 112, respectively, may also be used, in particular, depending on the loads to be expected during operation of the vehicle 101.

In the present example, the primary suspension unit 105 is a shear spring unit. Such shear spring units typically have the advantage that they provide suitable spring motion in their shear direction, typically in a shear plane, while being comparatively rigid in other directions (e.g., in a direction perpendicular to a shear plane of the shear spring unit). Hence, the shear spring elements 105.1 and 105.2 are well-known in the art and readily available in multiple configurations. Typically, such shear spring elements 105.1, 105.2 are formed by so-called laminated metal rubber elements which comprise one or more consecutive layers of metal and rubber.

More precisely, in the present example, each primary suspension element 105.1, 105.2 is arranged and configured such that, under static load of the rail vehicle on a straight level track, the primary suspension element 105.1, 105.2 is substantially exclusively under a shear stress.

It will be appreciated that, as noted above, the primary suspension unit 105 may comprise one or more primary suspension elements 105.1, 105.2 (per respective side in case of support on both sides) which may generally be of arbitrary shape and design, respectively. Typically these primary suspension elements 105.1, 105.2 are of course adapted to the requirements, in particular the loads to be taken, during operation of the rail vehicle 101. For example, one or (as in the present example) more block shaped primary suspension elements 105.1, 105.2 may be used, i.e., interposed between the wheel bearing unit 108.1 and the wheel support unit 108.3. With certain variants, the primary suspension unit 105 comprises a ring shaped primary suspension element 105.1 and 105.2, respectively providing resilient support of the wheel unit on the axle unit (as is indicated by the dashed contours 113 in FIG. 2). Thus, with certain variants, the respective ring shaped primary suspension element 105.1, 105.2 may fully surround the wheel support unit. This has the advantage that a particularly beneficial introduction of the loads from the wheel bearing unit into the wheel support unit may be achieved.

It will be further appreciated that, with further variants having a simple distributed configuration of the location of the primary suspension elements, the primary suspension unit 105 may comprise a plurality of primary suspension elements 105.1, 105.2 providing resilient support of the wheel unit 107 on the axle unit 108. It will be appreciated that such a distributed configuration of the primary suspension elements 105.1, 105.2 may be provided, for example, by having multiple primary suspension elements 105.1, 105.2, respectively, located on the same side of the wheel unit 107 and distributed along the circumferential direction CD of the wheel support unit 108.3. It will be further appreciated that the distribution of the primary suspension elements 105.1, 105.2 is typically adapted to the loads to be expected during operation. With certain variants, an essentially even distribution may be selected to provide even support.

As previously noted, the primary suspension unit 105 may comprise one or more primary suspension elements 105.1, 105.2 of arbitrary and suitable design and configuration.

Particularly compact designs may be achieved if the primary suspension unit 105, as in the present example, comprises primary suspension elements 105.1, 105.2 comprising at least one of a polymer element, a rubber element, and a laminated rubber metal spring element.

It will be appreciated that, in general, that the rigidity of the primary suspension unit 105 may be substantially uniform in all degrees of freedom in space. However, as in the present example, the primary suspension unit 105 may have different behavior in different degrees of freedom in order to account for the load cases to be expected during operation of the particular vehicle 101 the wheel arrangement 103 is to be operated on.

Hence, in the present example, the primary suspension unit 105 has a first rigidity in a first direction, a second rigidity in a second direction and a third rigidity in a third direction, the first, second and third direction being mutually orthogonal. During operation of the rail vehicle 101, the first direction is substantially parallel to a direction of travel of the rail vehicle 101 and the second direction is substantially parallel to a wheel contact plane defined by a track T used by the rail vehicle. Here, the third rigidity is lower than both the first rigidity and the second rigidity. By this means, a primary suspension may be achieved which is suitably compliant in the height direction of the vehicle (z-axis), while being comparatively rigid in the longitudinal direction (x-axis) and transverse direction (y-axis) of the vehicle 101. In particular, the first rigidity may be lower than the second rigidity.

Furthermore, with this design, a configuration as mentioned above is achieved, where the primary suspension unit 105 of the axle unit 108 is configured such that resilient support of the wheel bearing unit 108.1 is provided in two mutually transverse translational degrees of freedom in the plane of rotation defined by the wheel bearing unit 108.1, namely in the first direction and in the third direction. This configuration provides durable, low wear support with no frictional contact and friction loaded motion between the sprung and unsprung components. This resilient support in the first and third direction has the further beneficial effects on the running behavior of the wheel arrangement 103 that, among others, relative motions between the track T and the vehicle structure in these two directions can be absorbed at a very "early" stage (close to the point of wheel to rail contact).

It will be appreciated that the wheel support unit 108.3 may, in general, have any desired and suitable shape. Preferably, as in the present example, it is an elongated element, which can be substantially symmetric (typically rotationally symmetric) with respect to an axis 108.9 which (in an unloaded state) is substantially parallel to the axis of rotation 107.1 of the wheel unit 107. With other variants, however, as in the present example, the wheel support unit 108.3 may be a (potentially only slightly) asymmetric component to account for differences in the relative location of its components in their unloaded and loaded state. Moreover, the wheel support unit may be a substantially solid or plain component, or, as in the present example, a hollow component.

In the present example, the wheel arrangement 103 is configured for use in a motorized implementation. Hence, to achieve a very compact and beneficial configuration, the wheel support unit 108.3 is essentially tube shaped, wherein a drive shaft unit 114, at a first end, is connected to the wheel unit 107 by a torsionally rigid linkage 115 (only shown in a highly schematic way). The drive shaft unit 114 extends through an interior section of the wheel support unit 108.3.

The drive shaft unit, at its other (second) end opposite to the first end, is configured to be connected to the drive unit 106 of the rail vehicle 101. To this end, the drive shaft unit 114 has a toothed section 114.1 configured to connect to the drive unit 106. By this means a particularly beneficial and compact design may be achieved.

As can be seen from FIG. 2, in an unloaded state of the wheel arrangement (shown in solid lines), the primary suspension elements 105.1, 105.2 have a certain offset (along their shear plane or along the z axis, respectively) between their mounting faces (for mounting to the wheel bearing unit 108.1 and the wheel support unit 108.3, respectively) which holds the wheel unit 107 and the wheel bearing unit 108.1 in such a manner that the axis of rotation 107.1 of the wheel unit is parallel but offset from the longitudinal axis 108.9 of the wheel support unit 108.3. In the (statically) loaded state under nominal load, the wheel unit 107 is pushed upwards with respect to the wheel support unit 108.3, such that the axis of rotation 107.1 of the wheel unit substantially coincides with the longitudinal axis 108.9 of the wheel support unit 108.3 (as it is indicated by the dashed contour 116). This situation is accounted for in that the linkage 115 can follow this motion and in that the wheel support unit 108 has a slightly asymmetric or eccentric design.

While the present invention, in the foregoing has been mainly described in the context of a shear spring arrangement, it will be appreciated that the primary suspension unit, in principle, may be designed in any other desired and suitable way to achieve resilient primary suspension in the required degrees of freedom. In particular, primary suspension elements of any desired configuration and shape may be used instead of suspension elements 105.1, 105.2. For example, conventional metal spring elements may be used alone or in combination with other components, such as, for example, damping elements etc. Similarly, polymer springs, rubber springs or laminated metal rubber springs may be used alone or in arbitrary combination with other spring and/or damping elements.

Furthermore, while the present invention, in the foregoing, has been mainly described in the context of a single or individual wheel unit, it will be appreciated that the invention may also be used in any other wheel configuration, e.g., in the context of wheel pairs or wheel sets with a torsionally rigid coupling between the wheel units.

While the present invention, in the foregoing has been exclusively described in the context of light rail vehicles, it will be appreciated that the invention can also be applied for any other rail vehicles, in particular, other rail vehicles operating at considerably higher nominal speeds.

The invention claimed is:

1. A wheel arrangement for a rail vehicle, comprising:
   a wheel unit, and
   an axle unit, wherein
   said axle unit is configured to be connected to a running gear structure of said rail vehicle;
   said axle unit rotatably supports said wheel unit;
   said axle unit comprises a wheel bearing unit;
   said wheel bearing unit forms a bearing for said wheel unit and defines a wheel axis of rotation of said wheel unit during operation of said rail vehicle,
   said axle unit comprises a wheel support unit and a primary suspension unit, said wheel support unit being tube-shaped;
   said primary suspension unit is located kinematically in series between said wheel support unit and said wheel bearing unit;

said wheel support unit supports said wheel bearing unit via said primary suspension unit in a manner resilient in at least two mutually transverse translational degrees of freedom;

said primary suspension unit comprising at least one primary suspension element providing resilient support of said wheel unit on said axle unit; and said at least one primary suspension element being arranged and configured such that, under static load of said rail vehicle on a straight level track, said primary suspension element is under a shear stress.

2. The wheel arrangement according to claim 1, wherein:

a gap is formed between said wheel support unit and said wheel bearing unit;

said primary suspension unit is connected to said wheel support unit and said wheel bearing unit; and said primary suspension unit bridges at least a part of said gap between said wheel support unit and said wheel bearing unit.

3. The wheel arrangement according to claim 1, wherein:

said primary suspension unit is a shear spring unit; and said shear spring unit comprising at least one shear spring element providing resilient support of said wheel unit on said axle unit.

4. The wheel arrangement of claim 1, wherein:

said primary suspension unit comprises at least one ring shaped primary suspension element providing resilient support of said wheel unit on said axle unit; and said at least one primary suspension element extending along an outer circumference of said wheel support unit.

5. The wheel arrangement of claim 1, wherein:

said primary suspension unit comprises a plurality of primary suspension elements providing resilient support of said wheel unit on said axle unit; and said plurality of primary suspension elements being distributed along an outer circumference of said wheel support unit.

6. The wheel arrangement of claim 1, wherein:

said wheel bearing unit has a recess;

said wheel support unit at least partially extends into said recess, wherein, said wheel support unit; and/or said recess defines a recess axis, said recess axis, in an unloaded state of said wheel arrangement, extending at least substantially parallel to said wheel axis of rotation.

7. The wheel arrangement of claim 6, wherein said primary suspension unit comprises at least one primary suspension element providing resilient support of said wheel unit on said axle unit;

said primary suspension element is connected to said wheel support unit and said wheel bearing unit; and at least a part of said primary suspension element extends within said recess.

8. The wheel arrangement of claim 1, wherein:

said wheel support unit defines a wheel support unit axial direction, a wheel support unit circumferential direction and a wheel support unit radial direction, said wheel support unit axial direction, in an unloaded state of said wheel arrangement, extending at least substantially parallel to said wheel axis of rotation;

at least one radial protrusion protrudes from said wheel support unit in said wheel support unit radial direction;

said primary suspension unit is connected to a face of said at least one radial protrusion facing towards said wheel bearing unit; and said at least one radial protrusion extends along said wheel support unit circumferential direction over at least 45%, at least 60%, at least 80%, or at least 100%, of a circumference of said wheel support unit.

9. The wheel arrangement according to claim 8, wherein:

an inner radial protrusion is located on an inner side of said wheel bearing unit, said inner side, during use of said rail vehicle on a track, facing towards a center of said track;

an outer radial protrusion is located on an outer side of said wheel bearing unit, said outer side, during use of said rail vehicle, facing away from said center of said track; and to provide resilient support of said wheel unit on said axle unit, at least one inner primary suspension element of said primary suspension unit is connected to said inner radial protrusion and to an associated inner radial segment of said wheel bearing unit, and at least one outer primary suspension element of said primary suspension unit is connected to said outer radial protrusion and to an associated outer radial segment of said wheel bearing unit.

10. The wheel arrangement of claim 1, wherein:

said wheel support unit defines a wheel support unit axial direction, a wheel support unit circumferential direction and a wheel support unit radial direction, said wheel support unit axial direction, in an unloaded state of said wheel arrangement, extending at least substantially parallel to said wheel axis of rotation;

said wheel support unit defines a radial cavity, said radial cavity extending in said wheel support unit circumferential direction and in said a wheel support unit radial direction; and at least a part of said wheel bearing unit is inserted, in said wheel support unit radial direction, into said radial cavity.

11. The wheel arrangement of claim 1, wherein:

said primary suspension unit comprises at least one primary suspension element providing resilient support of said wheel unit on said axle unit, said primary suspension element comprising at least one of a polymer element, a rubber element, and a laminated rubber metal spring element.

12. The wheel arrangement of claim 1, wherein:

said primary suspension unit has a first rigidity in a first direction, a second rigidity in a second direction and a third rigidity in a third direction, said first, second and third direction being mutually orthogonal;

during operation of said rail vehicle, said first direction is substantially parallel to a direction of travel of said rail vehicle and said second direction is substantially parallel to a wheel contact plane defined by a track used by said rail vehicle;

wherein said third rigidity is lower than at least one of said first rigidity and said second rigidity;

and/or said first rigidity is lower than said second rigidity.

13. The wheel arrangement of claim 1, wherein:

a drive shaft unit, at a first end, is connected to said wheel unit;

said drive shaft unit extends through an interior section of said tube-shaped wheel support unit; and

said drive shaft unit, at a second end opposite to the first end, is configured to be connected to a drive unit of said rail vehicle and has a toothed section configured to connect to said drive unit.

14. A rail vehicle unit comprising:

a rail vehicle structure; and at least one wheel arrangement of claim 1, connected to said rail vehicle structure, wherein, said rail vehicle structure comprises a running gear unit connected to said at least one wheel arrangement.

15. A wheel arrangement for a rail vehicle, the wheel arrangement comprising:

a wheel unit, and an axle unit, wherein said axle unit is configured to be connected to a running gear structure of said rail vehicle;

said axle unit rotatably supports said wheel unit;

said axle unit comprises a wheel bearing unit;

said wheel bearing unit forms a bearing for said wheel unit and defines a wheel axis of rotation of said wheel unit during operation of said rail vehicle,

said axle unit comprises a wheel support unit and a primary suspension unit;

said primary suspension unit is located kinematically in series between said wheel support unit and said wheel bearing unit; and, said wheel support unit supports said wheel bearing unit via said primary suspension unit in a manner resilient in at least two mutually transverse translational degrees of freedom, wherein said wheel support unit is tube-shaped;

a drive shaft unit, at a first end, is connected to said wheel unit;

said drive shaft unit extends through an interior section of said tube-shaped wheel support unit; and said drive shaft unit, at a second end opposite to the first end, is configured to be connected to a drive unit of said rail vehicle, in particular, has a toothed section configured to connect to said drive unit.

* * * * *